United States Patent
Shen et al.

(10) Patent No.: US 9,630,260 B1
(45) Date of Patent: Apr. 25, 2017

(54) REAR-MOUNTED DEEP HOLE MACHINING ON-LINE DETECTION AND DEVIATING CORRECTION DEVICE

(71) Applicant: NORTH UNIVERSITY OF CHINA, Shanxi (CN)

(72) Inventors: Xingquan Shen, Shanxi (CN); Daguo Yu, Shanxi (CN); Yanlan Li, Shanxi (CN); Xiaobin Huang, Shanxi (CN); Chuangmin Wang, Shanxi (CN); Xiaoming Bo, Shanxi (CN); Baoluo Quan, Shanxi (CN); Zhen Dong, Shanxi (CN)

(73) Assignee: North University of China, Shanxi (CN)

( * ) Notice: Subject to any disclaimer, the term of this patent is extended or adjusted under 35 U.S.C. 154(b) by 0 days.

(21) Appl. No.: 14/966,353

(22) Filed: Dec. 11, 2015

(30) Foreign Application Priority Data

Nov. 13, 2015 (CN) .......................... 2015 1 0774055

(51) Int. Cl.
*B23B 25/00* (2006.01)
*B23B 41/02* (2006.01)
(Continued)

(52) U.S. Cl.
CPC ............ *B23B 41/02* (2013.01); *B23B 29/027* (2013.01); *B23Q 15/14* (2013.01); *G01S 17/42* (2013.01);
(Continued)

(58) Field of Classification Search
CPC ....... B23B 25/06; B23B 25/065; B23B 49/04; B23B 49/00; B23B 41/02; B23B 29/027;
(Continued)

(56) References Cited

U.S. PATENT DOCUMENTS

| | | | | |
|---|---|---|---|---|
| 4,044,936 A | * | 8/1977 | Obersby | ............. C03B 33/0955 219/121.6 |
| 2010/0288089 A1 | * | 11/2010 | Miyamoto | ................ B23B 5/08 82/118 |

(Continued)

*Primary Examiner* — Will Fridie, Jr.
(74) *Attorney, Agent, or Firm* — Lowenstein Sandler LLP; Jialin Zhong, Esq.

(57) ABSTRACT

The present disclosure relates to the technical field of deep hole machining, particularly to a rear-mounted deep hole machining on-line detection and deviating correction device, which provide solution to the difficulty in observing the machining site and correcting the cutter deviation in deep hole machining. The device comprises a cutter bar provided with a plurality of iron blocks mounted uniformly in a circumferential direction, wherein each of the iron blocks is provided with a heating device in the interior thereof and a wear-resistant block mounted on the top thereof, wherein mounted on an end face of the other end of the cutter bar is a pyramid prism, wherein a laser transmitter and a photo-sensitive sensor are mounted in a height corresponding to the height range of the pyramid prism, wherein the incident beam emitted by the laser transmitter is oriented by a laser orientating block. The advantages of the disclosure lie in that the information of the position the deep hole cutter during deep hole machining process and whether the deep hole is skewed or not can be obtained in time, thereby facilitating a solution to the difficulty in detecting the workpiece deep hole straightness and on-line deviating correction, improving the position accuracy such as straightness of the deep hole and reducing the rejection rate of the workpiece.

6 Claims, 3 Drawing Sheets

(51) Int. Cl.
  *B23B 29/02* (2006.01)
  *B23Q 15/14* (2006.01)
  *G01S 17/42* (2006.01)
  *B23B 49/00* (2006.01)

(52) U.S. Cl.
  CPC ... *B23B 2260/092* (2013.01); *B23B 2260/128* (2013.01)

(58) Field of Classification Search
  CPC ........ B23B 2260/092; B23B 2260/128; B23Q 17/2404; B23K 26/02; B23K 26/0096; B23K 26/50; B23K 26/0652
  See application file for complete search history.

(56) References Cited

U.S. PATENT DOCUMENTS

| | | | |
|---|---|---|---|
| 2014/0090846 A1* | 4/2014 | Deutch | E21B 29/00 166/297 |
| 2014/0231085 A1* | 8/2014 | Zediker | E21B 29/02 166/288 |
| 2016/0151873 A1* | 6/2016 | Richt | B23B 49/00 408/16 |
| 2016/0297009 A1* | 10/2016 | Coakley | B23B 3/265 |

\* cited by examiner

REAR-MOUNTED DEEP HOLE MACHINING ON-LINE DETECTION AND DEVIATING CORRECTION DEVICE

RELATED APPLICATIONS

The present application claims priority to China Patent Application Serial No. CN 201510774055.2 filed on Nov. 13, 2015, which is hereby incorporated by reference in its entirety.

TECHNICAL FIELD

The present disclosure relates to the technical field of deep hole machining, particularly to a rear-mounted deep hole machining on-line detection and deviating correction device.

BACKGROUND

Boring, reaming, enlarging or honing a hole means enlarging the diameter of an existing hole such that the accuracy can be improved and the surface roughness can be reduced, and under some circumstances the initially skewing of an axis of the hole can be well corrected.

During the process of deep hole machining, a cutter bar is limited by the hole diameter such that the cutter bar has a small diameter and a long length, resulting in weak rigidity and low strength. During the process of deep hole machining, vibration, corrugation, taper and tilt may often occur, which impinge the straightness of the deep hole. Meanwhile, it is difficult to observe the machined site and the cutting conditions of the cutter, such that the skewing of the cutter bar would hardly be noticed and thus it would have difficulty in correction of the deviation in time. There is no effective technique and device which can in real time detect and correct the position of deep hole cutter during deep hole machining.

SUMMARY OF THE DISCLOSURE

Therefore, it is the object of the disclosure to address the prior art drawbacks and solve the problem of the difficulty in detecting the straightness of the deep hole and correcting the skewing of the deep hole cutter in real time. The disclosure is applicable to the deep hole machining processes in which a workpiece rotates and a deep hole cutter feeds, and the machining processes may detect the position of the deep hole cutter in real time by means of laser detection, and automatically adjust the position of the deep hole cutter as desired to revert it back to the correct, initial position.

In the disclosure the solution to the above object is provided: a rear-mounted deep hole machining on-line detection and deviating correction device, comprising a cutter bar, a deep hole cutter and a cutter bar support, wherein the deep hole cutter is fixed to the cutter bar, the cutter bar support is fixed to a slide plate which is rested on a machine tool bed, one end of the cutter bar is fixed to the cutter bar support, wherein the cutter bar is provided with a plurality of iron blocks arranged uniformly in the circumferential direction between the deep hole cutter and an end face of the machined deep hole and each of the iron blocks is provided with a heating device in the interior thereof and a wear-resistant block mounted on the top thereof; wherein the iron block together with the wear-resistant block form a radial profile dimension smaller than a diameter of the machined hole of the workpiece; wherein when the heating device is not heating up, the iron block does not expand, and thus the wear-resistant block on the top thereof makes no contact with an inner wall of the machined hole of the workpiece, and when the heating device is heating up, the iron block expands, and thus the wear-resistant block on the top thereof contacts with the inner wall of the machined hole of the workpiece; wherein the iron blocks are located at a side of the machined hole. Mounted on an end face of the other end of the cutter bar is a pyramid prism support in a height corresponding to the height of a spindle bore of a spindle box of the machine tool, and mounted on the pyramid prism support are a pyramid prism and a pyramid prism support cover; wherein a laser transmitter and a photosensitive sensor are mounted on an outer frame, which is fixed to the machine tool bed, in a height corresponding to the height range of the pyramid prism; wherein the incident beam emitted by the laser transmitter is oriented by a laser orientating block so as to be in parallel with the initial axis of the cutter bar; wherein the incident beam travels through the unmachined hole of the workpiece and then through the pyramid prism to from a return beam which travels backwardly through the unmachined hole of the workpiece and reaches the photosensitive sensor, which sends signals to a computer.

The rear-mounted deep hole machining on-line detection and deviating correction device is characterized in that the laser orientating block is in form of a cylinder having diameter equal to that of the spindle bore and mounted in the spindle bore between the pyramid prism support and the laser transmitter; wherein the laser orientating block is provided two light apertures, i.e., a first light aperture and a second light aperture, respectively; wherein the incident beam emitted by the laser transmitter travels forwardly through the first light aperture of the laser orientating block, and then through the pyramid prism so as to travel backwardly in parallel with the incident direction through the second light aperture; wherein the return laser beam is in parallel with the axis of the cutter bar; wherein the laser orientating block is used in the laser orientating adjustment, and is retained or removed after the adjustment.

The rear-mounted deep hole machining on-line detection and deviating correction device is characterized in that the deep hole cutter is in form of a boring cutter, a reamer, a drilling bit or a honing tool.

The rear-mounted deep hole machining on-line detection and deviating correction device is characterized in that the wear-resistant block is made of cemented carbide.

The rear-mounted deep hole machining on-line detection and deviating correction device is characterized in that the heating device is in form of an electrically resistive heating device, an electromagnetic heating device or an infrared heating device.

The rear-mounted deep hole machining on-line detection and deviating correction device is characterized in that three or more iron blocks are provided.

As discussed above, the present disclosure mainly comprises a laser transmitter, a photosensitive sensor, a pyramid prism support, a pyramid prism, a laser orientating block, a computer, a deep hole cutter, a cutter bar, iron blocks, a wear-resistant blocks, heating devices and the like. One end of the workpiece is clamped and positioned by means of a clamper, the other end is supported by a center support such that the workpiece is rotatably driven by the machine tool.

The disclosure takes full advantage of the property of laser and prism to on-line detect the position of the deep hole cutter. The laser transmitter on the outer frame transmits laser which is reflected by the pyramid prism and reaches the photosensitive sensor. The skewing of the deep hole cutter or the axis of the deep hole is reflected by the facular variation on the photosensitive sensor, and detection and deviating correction results are displayed by the computer in real time. The disclosure provides solution to correcting the position of the deep hole cutter if it is deviating from its correct position, such that when the deep hole cutter is deviating to the right, the heating device on the right heats up to make the iron block to expand, and thus the wear-resistant block on the top of the iron block contacts with the inner wall of the machined workpiece hole, and pushes the deep hole cutter back to its correct position by interacted force, and similarly, when the deep hole cutter is deviating to the left, the heating device on the left heats up to make the deep hole cutter back to its correct position. In general, in the disclosure one or more heating devices heat up to correct the skewing of the deep hole cutter without stopping the process. The heating temperature is related to the required amount of correction.

When the deep hole cutter deviates from its correct position, the facular varies on the photosensitive sensor. An A/D converter may transform the variation to digital signals which may be received and processed by the computer. A power source is energized to output a voltage based on the output control signal from the computer, such that the heating device on the iron block heats up to make the respective iron block expands. Thereby the wear-resistant block on the top of the iron block contacts with the inner wall of the machined hole of the workpiece. It is for the first time presented by the disclosure that the position of the deep hole cutter is corrected by the expansion of an iron block to locate the deep hole cutter in the correct position.

The disclosure provides advantages of ensuring good straightness and position accuracy of the machined deep hole. Specifically, the advantages includes: Firstly, the laser transmitter and the photosensitive sensor are positioned on the outer frame, such that high temperature generated during the machining process is avoided from affecting the laser transmitter and the sensor. If one of the laser transmitter and the photosensitive sensor were to be positioned within the hole, it would be difficult to achieve the detection effect due to the generated high temperature. The disclosure takes full advantage of the parallel reflection of the laser beam produced by the pyramid prism to achieve the aforementioned effect. Secondly, by means of observing the graphics displayed on the computer, the position variation of the deep hole cutter is detected on line and thus the working conditions of the workpiece rotation and the deep cutter feeding during the deep hole machining process are obtained in time. Since the position variation of the deep hole cutter indirectly reflects the hole quality, the disclosure may be also applicable as a straightness inspection apparatus for the deep hole. Thirdly, when the skewing of the deep hole cutter is detected, correction of deviation of the deep hole cutter position may be made in time. The cutter bar of the disclosure is provided circumferentially with iron blocks having the heating devices therein and the wear-resistant devices on the top thereof. The heating devices are electrically resistive heating device, electromagnetic heating device or infrared heating device, with a compact footprint, high resolution of displacement, quick response and great output force, such that it is possible to adjust the position of the deep hole cutter in time by means of the heating device. What is particularly important is that the disclosure corrects the deviation of the deep hole cutter based on the heat expansion and cold contraction theory. Since it only needs to lead a wire to the components such as electrical resistance, a compact structure is achieved. In general, the disclosure improves the solution to correction of the deep hole machining deviation.

BRIEF DESCRIPTION OF THE DRAWINGS

The present disclosure is illustrated by way of example, and not by way of limitation, in the figures of the accompanying drawings.

Components in the figures: 1—computer, 2—laser transmitter, 3—photosensitive sensor, 4—spindle box, 5—spindle, 6—clamper, 7—pyramid prism support cover, 8—pyramid prism, 9—pyramid prism support, 10—fastening screw, 11—deep hole cutter, 12—iron block, 13—workpiece, 14—cutter bar, 15—center support, 16—cutter bar support, 17—slide plate, 18—machine tool bed, 19—wear-resistant block, 20—heating device, 21—outer frame, 22—laser orientating block, 23—first light aperture, 24—second light aperture.

DETAILED DESCRIPTION

The embodiments of the disclosure may be described below in detail with reference to accompanying drawings. These embodiments should be construed as describing the disclosure, but not for limiting the scope of the disclosure.

Figure 1:
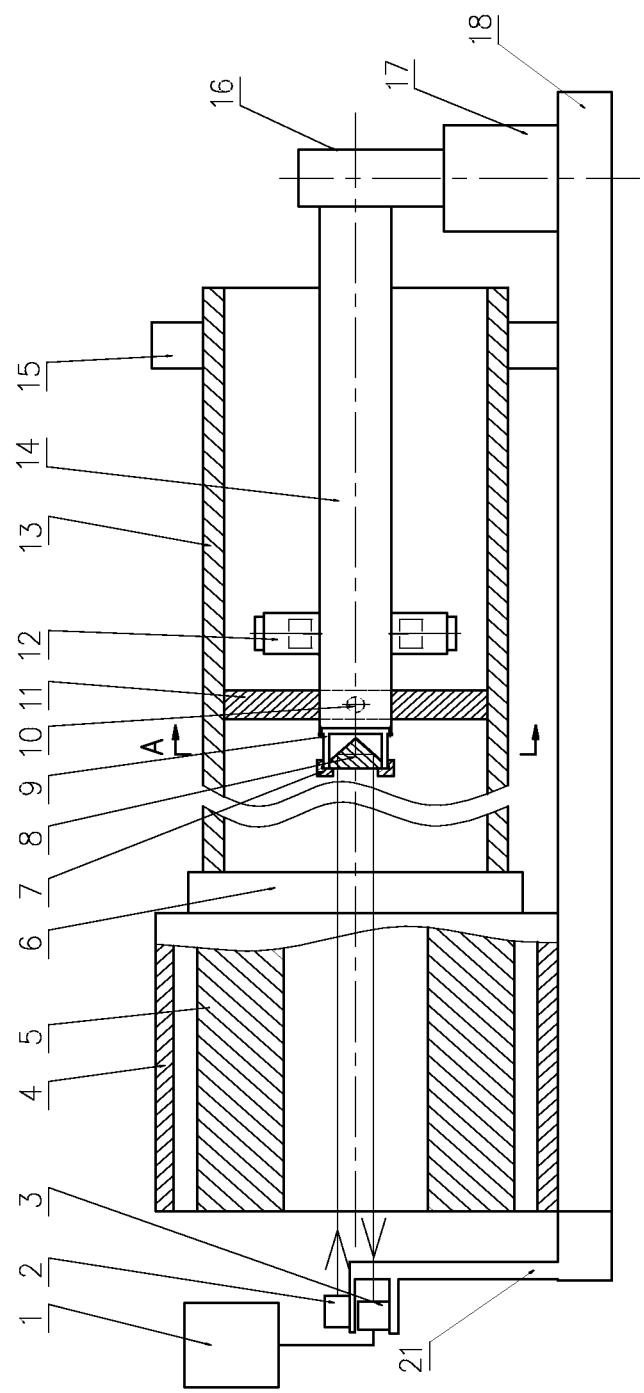
FIG. 1 shows a structurally schematic view of the disclosure according to an embodiment of the present disclosure.
Figure 2:
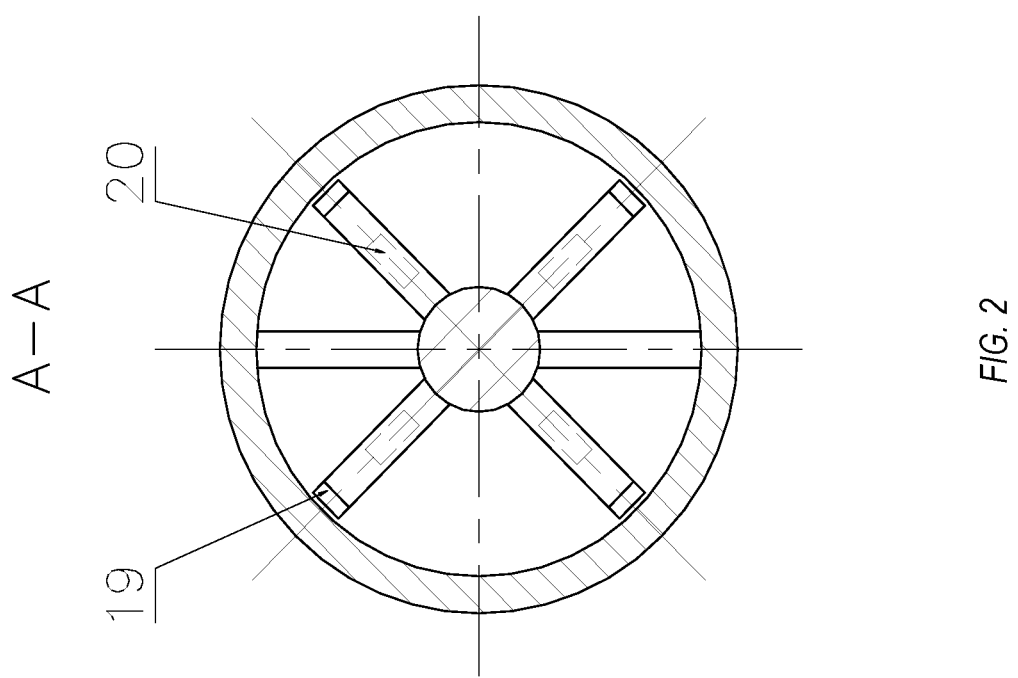
FIG. 2 shows an end view of a cutter bar according to an embodiment of the present disclosure.
Figure 3:
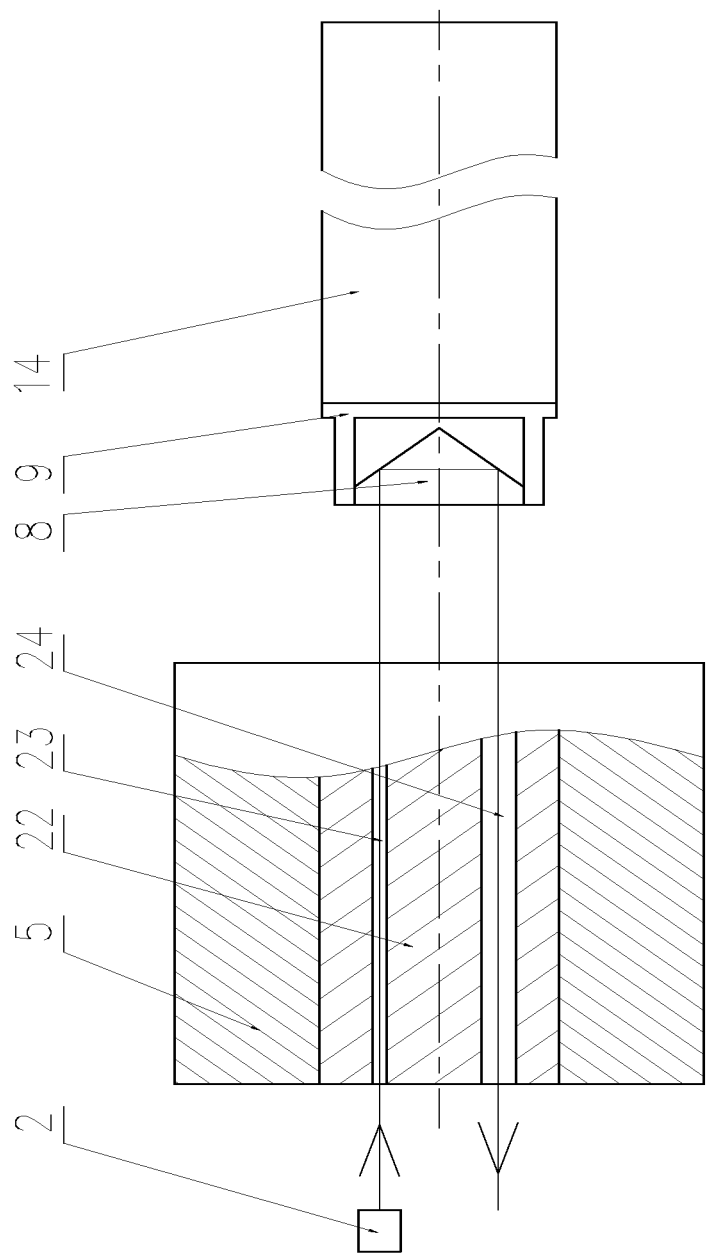
FIG. 3 shows a view of laser orientation according to an embodiment of the present disclosure.

As shown in FIGS. 1-3, a workpiece 13 rotates and a deep hole cutter 11 feeds. The workpiece 13 is provided with a bottom hole, and a deep hole with a horizontal axis is to be machined.

The present disclosure includes a deep hole cutter 11, a cutter bar 14, a computer 1, a laser transmitter 2, a photosensitive sensor 3, a spindle box 4, a spindle 5, a clamper 6, a pyramid prism support cover 7, a pyramid prism 8, a pyramid prism support 9, a fastening screw 10, iron blocks 12, a center support 15, a cutter bar support 16, a slide plate 17, a machine tool bed 18, wear-resistant blocks 19, heating devices 20, an outer frame 21, a laser orientating block 22 and the like. One end of the workpiece 13 is clamped and positioned by the clamper 6, the other end is supported by the center support 15 such that the workpiece is rotatably driven by the machine tool.

The deep hole cutter 11 is fixed to the cutter bar 14 by means of the fastening screw 10. One end of the cutter bar 14 is fixed to the cutter bar support 16, which is fixed to the slide plate 17 rested on the machine tool bed 18. The cutter bar 14 is provided with a plurality of iron blocks 12 arranged uniformly in the circumferential direction between the deep hole cutter 11 and an end face of the machined deep hole and each of the iron blocks 12 is provided with a heating device 20 in the interior thereof and a wear-resistant block 19 mounted on the top thereof; wherein the iron block 12 together with the wear-resistant block 19 form a radial profile dimension smaller than a diameter of the machined hole of the workpiece 13; wherein when the heating device 20 is not heating up, the iron block 12 does not expand, and thus the wear-resistant block 19 on the top thereof makes no contact with an inner wall of the hole of the workpiece 13, and when the heating device 20 is heating up, the iron block 12 expands, and thus the wear-resistant block 19 on the top thereof contacts with the inner wall of the hole of the workpiece 13; wherein the iron blocks 12 are located at a side of the machined hole. Mounted on an end face of the other end of the cutter bar 14 is a pyramid prism support 9, and mounted on the pyramid prism support 9 are a pyramid prism 8 and a pyramid prism support cover 7; wherein a laser transmitter 2 and a photosensitive sensor 3 are mounted on an outer frame 21, which is fixed to the machine tool bed 18, in a height corresponding to the height range of the pyramid prism 8; wherein the incident beam emitted by the laser transmitter 2 is oriented by a laser orientating block 22 so as to be in parallel with the initial axis of the cutter bar 14; wherein the incident beam travels through the unmachined hole of the workpiece 13 and then through the pyramid prism 8 to from a return beam which travels backwardly through the unmachined hole of the workpiece 13 and reaches the photosensitive sensor 3, which sends signals to a computer 1.

The return beam is in parallel with, but in opposite direction to the initially incident beam. The signals received by the computer 1 is analyzed to calculate the deep hole straightness. In the process of machining the deep hole, if the deep hole cutter 11 deviates from the correct, initial position, the facular on the surface of the photosensitive sensor 3 varies. The information regarding facular variation is then transmitted to the computer 1, and the power source is energized to output certain value of voltage based on the output control signals from the computer 1.

The laser orientating block 22 is in form of a cylinder having diameter equal to that of the spindle bore and mounted in the spindle bore between the pyramid prism support 9 and the laser transmitter 2. The laser orientating block 22 is provided two light apertures, a first light aperture 23 and a second light aperture 24, respectively. The incident beam emitted by the laser transmitter 2 travels forwardly through the first light aperture 23 of the laser orientating block 22, and then through the pyramid prism 8 so as to travel backwardly in parallel with the incident direction through the second light aperture 24. The return laser beam is in parallel with the axis of the cutter bar 14. The laser orientating block 22 is used in the laser orientating adjustment, and is retained or removed after the adjustment.

The deep hole cutter can be in the form of a boring cutter, a reamer, a drilling bit, or a honing tool.

The wear-resistant block is made of cemented carbide.

The heating device can be in the form of an electrically resistive heating device, an electromagnetic heating device, or an infrared heating device.

Three or more iron blocks are provided.

What is claimed is:

1. A rear-mounted deep hole machining on-line detection and deviating correction device, comprising:
    a cutter bar;
    a deep hole cutter; and
    a cutter bar support, wherein the deep hole cutter is fixed to the cutter bar, the cutter bar support is fixed to a slide plate which is rested on a machine tool bed, and one end of the cutter bar is fixed to the cutter bar support, wherein the cutter bar is provided with a plurality of iron blocks arranged uniformly in a circumferential direction between the deep hole cutter and an end face of a machined hole of a workpiece, and each of the iron blocks is provided with a heating device in an interior thereof and a wear-resistant block mounted on a top thereof, wherein the iron block together with the wear-resistant block form a radial profile dimension smaller than a diameter of the machined hole of the workpiece, wherein when the heating device is not heating up, the iron block does not expand, and thus the wear-resistant block on the top thereof makes no contact with an inner wall of the machined hole of the workpiece, and when the heating device is heating up, the iron block expands, and thus the wear-resistant block on the top thereof contacts with the inner wall of the machined hole of the workpiece, wherein mounted on an end face of another end of the cutter bar is a pyramid prism support in a height corresponding to a height range of a spindle bore of a spindle box of the machine tool, and mounted on the pyramid prism support are a pyramid prism and a pyramid prism support cover, wherein a laser transmitter and a photosensitive sensor are mounted on an outer frame, which is fixed to a machine tool bed in a height corresponding to the height range of the pyramid prism, wherein an incident beam emitted by the laser transmitter is oriented by a laser orientating block so as to be in parallel with an initial axis of the cutter bar, wherein the incident beam travels through an unmachined hole of the workpiece and then through the pyramid prism to form a return beam which travels backwardly through the unmachined hole of the workpiece and reaches the photosensitive sensor which sends signals to a computer.

2. The rear-mounted deep hole machining on-line detection and deviating correction device according to claim 1, wherein the laser orientating block is in a form of a cylinder having diameter equal to that of the spindle bore and mounted in the spindle bore between the pyramid prism support and the laser transmitter, wherein the laser orientating block is provided with a first light aperture and a second light aperture, respectively, wherein the incident beam emitted by the laser transmitter travels forwardly through the first light aperture of the laser orientating block, and then through the pyramid prism so as to travel backwardly in parallel with an incident direction through the second light aperture, wherein the return laser beam is in parallel with the axis of the cutter bar, wherein the laser orientating block is used in the laser orientating adjustment and is one of retained or removed, after the adjustment.

3. The rear-mounted deep hole machining on-line detection and deviating correction device according to claim 1, wherein the deep hole cutter is in a form of one of a boring cutter, a reamer, a drilling bit, or a honing tool.

4. The rear-mounted deep hole machining on-line detection and deviating correction device according to claim 1, wherein the wear-resistant block is composed of cemented carbide.

5. The rear-mounted deep hole machining on-line detection and deviating correction device according to claim 1, wherein the heating device is in a form of one of an electrically resistive heating device, an electromagnetic heating device, or an infrared heating device.

6. The rear-mounted deep hole machining on-line detection and deviating correction device according to claim 1, wherein the plurality of iron blocks comprise three or more iron blocks.

\* \* \* \* \*